United States Patent Office 2,930,770
Patented Mar. 29, 1960

2,930,770
PREPARATION OF CELLULAR POLYVINYL RESINS

Robert C. Wade, Ipswich, Mass., assignor to Metal Hydrides Incorporated, Beverly, Mass., a corporation of Massachusetts No Drawing. Application March 18, 1957
Serial No. 646,522

4 Claims. (Cl. 260—2.5)

The present invention relates to a method of preparing cellular products which are useful insulating materials. More particularly, the invention contemplates the preparation of such products from aqueous dispersions or emulsions of polyvinyl acetate and aqueous solutions of polyvinyl alcohol both of which are readily available, cheap plastic materials.

In accordance with the method of the present invention an aqueous emulsion of polyvinyl acetate or a solution of polyvinyl alcohol in water is gelled to form a semi-solid doughy mass capable of being shaped by mechanical means. After the gelled mass has been shaped, a gas is generated in situ to cause the gelled mass to expand and become cellular. The cellular mass then is dried to remove the contained water and form a hard cellular body.

The present invention is based upon the discovery that when a small amount of an alkali metal borohydride, preferably in the form of a concentrated aqueous solution, is mixed with an aqueous emulsion of polyvinyl acetate or an aqueous solution of polyvinyl alcohol having a consistency not less than that of ordinary paint, the liquid mass is gelled rapidly and converted to a non-sticky, semi-solid doughy mass in a few seconds capable of being shaped by mechanical means to a desired shape, such as by rolling to form sheets. By permitting the shaped mass to stand at room temperature, the water present decomposes the alkali metal borohydride to generate hydrogen gas in situ to expand the mass and render it cellular. By permitting the cellular mass to stand at room temperature the remaining water evaporates to form a hard cellular body. The decomposition or hydrolysis of the alkali metal borohydride can be hastened greatly by heating and takes place at a satisfactory rate at temperatures above 50° C. At temperatures greater than 125° C., thick sections of the expanded material tend to collapse. It is preferred to effect decomposition of the borohydride and drying of the cellular mass at temperatures not greater than about 100° C. and, preferably, between 50° C. and 75° C.

The aqueous emulsion of polyvinyl acetate and the aqueous solution of polyvinyl alcohol used should be neutral or slightly alkaline to assure that no appreciable hydrolysis of the alkali metal borohydride takes place until after the aqueous emulsion of polyvinyl acetate or the aqueous solution of polyvinyl alcohol has been converted to a deformable gel and the gel shaped to desired form. To assure that these aqueous materials are neutral or slightly acid, a small amount of ammonia may be added until their pH value is between 7.0 and about 8.0.

Sodium borohydride is especially suitable for use in the practice of the invention since it is industrially available and one gram will produce 2.37 liters of hydrogen. Only a small amount is required to effect the gelling of the liquid mass as above described and greatly expand the gelled mass. The gelling phenomenon is observed with as little as 0.2 percent of sodium borohydride based upon the weight of the resin solids present. Potassium borohydride is equally suitable. In practice, from about 0.1 to about 0.5 part of sodium borohydride or potassium borohydride is used for each 100 parts by weight of the aqueous emulsion of polyvinyl acetate or aqueous solution of polyvinyl alcohol. Other borohydrides, such as lithium borohydride and calcium borohydride, may be used but are less desirable since they are less stable in aqueous solutions.

The invention is illustrated further by the following specific examples.

Example 1

Fifty grams of an aqueous emulsion of polyvinyl acetate containing 60 to 70 percent solids by weight were mixed with 2 to 3 drops of aqueous ammonia to increase its pH value to about 8.0. Then 0.1 gram of sodium borohydride dissolved in 0.5 gram of water was quickly and thoroughly mixed into the mass. Within a few seconds after mixing, the mass gelled to a semi-solid doughy mass which was no longer sticky. Part of this gelled mass was rolled to form flat sheets which were placed in an oven at 60 to 80° C. for one hour. About a 3-fold expansion in volume took place during this time and the shapes were pliable but solid. They were removed from the oven and allowed to dry at room temperature for several hours. Excellent hard cellular structures were obtained having a density of about 30 lbs. per cubic foot. The other part of the gelled mass was allowed to expand and dry at room temperature to produce a fine cellular structure of great strength.

The above procedure was repeated except that 0.25 gram of potassium borohydride was used in place of sodium borohydride. Again, an excellent cellular structure was produced when the gelled material was warmed in an oven at 70° C. for 30 minutes. Final drying was carried out at room temperature to produce a hard cellular structure.

Example 2

Ten grams of polyvinyl alcohol powder was dissolved in 50 cc. of water to obtain a solution containing about 20 percent by weight of polyvinyl alcohol. This was stirred until a smooth paste was obtained. Then 0.5 gram of sodium borohydride dissolved in 2 cc. of water was added and stirred into the water solution of polyvinyl alcohol. The mass gelled and became very rubbery within a few seconds. This mass was placed in an open mold which was placed in an oven at 60° C. for one hour. A marked expansion occurred. The mass was removed from the open and placed in a vacuum chamber overnight to complete the removal of water. A very light tough foamed mass was finally obtained whose density was about 2 lbs. per cubic foot.

Example 3

13.5 grams of polyvinyl alcohol powder was dissolved in 90 grams of water by warming and stirring until a smooth paste was obtained containing about 15 percent by weight of polyvinyl alcohol. Then 4 grams of sodium borohydride dissolved in 15 cc. of water was added to this paste. The resulting rubbery mass was placed in an open mold and heated in an air oven to 100° C. for 2 hours. The cellular material remained stable and became very hard and light. It had a density of between 2 to 3 lbs. per cubic foot.

I claim:
1. The method of preparing cellular products which comprises converting a liquid mass having a consistency of about that of ordinary paint and a pH value between about 7.0 and 8.0 and selected from the group consisting of a water emulsion of a polyvinyl acetate and a solution of polyvinyl alcohol in water and mixtures thereof to a gel by mixing therewith a concentrated solution of an alkali metal borohydride, the amount of alkali metal borohydride used being from about 0.1 to 0.5 part for each 100 parts of said liquid mass by weight, then causing the water to react with the alkali metal borohydride in the gel by heating the latter at a temperature between room temperature and 125° C. thereby generating hydrogen gas within the gel to render the latter cellular, and thereafter continuing said heating until the cellular mass is dry.

2. The method as claimed by claim 1 wherein the alkali metal borohydride is selected from the group consisting of sodium borohydride and potassium borohydride.

3. The method as claimed by claim 2 wherein said heating is conducted at a temperature not greater than 100° C.

4. The method is claimed by claim 2 wherein said heating is conducted at a temperature between about 50° C. and 75° C.

References Cited in the file of this patent

UNITED STATES PATENTS

| | | |
|---|---|---|
| 2,311,233 | Jaenicke et al. | Feb. 16, 1943 |
| 2,384,611 | Douthett | Sept. 11, 1945 |
| 2,386,995 | Wigal | Oct. 16, 1945 |
| 2,439,108 | Staehle | Apr. 6, 1948 |
| 2,758,980 | Talalay et al. | Aug. 14, 1956 |